United States Patent [19]
Stelljes

[11] Patent Number: 6,055,939
[45] Date of Patent: May 2, 2000

[54] TRAINING CAROUSEL

[76] Inventor: Heiko Stelljes, Dorfstrasse 40, Schwanewede, Germany

[21] Appl. No.: 09/312,523

[22] Filed: May 14, 1999

[30] Foreign Application Priority Data

May 16, 1998 [DE] Germany .......................... 198 22 132

[51] Int. Cl.$^7$ .................................................. A01K 15/00
[52] U.S. Cl. ............................................................. 119/712
[58] Field of Search ................................... 119/701, 712, 119/703, 704; 231/7; 54/24, 85, 62

[56] References Cited

U.S. PATENT DOCUMENTS

| 3,349,751 | 10/1967 | Frostad | 119/72 |
| 3,773,018 | 11/1973 | Profughi | 119/712 |
| 4,128,200 | 12/1978 | Jones et al. | 231/7 |
| 4,997,127 | 3/1991 | McEwen | 231/7 |
| 5,630,380 | 5/1997 | Karanges | 119/712 |

*Primary Examiner*—Thomas Price
*Attorney, Agent, or Firm*—Baker Botts L.L.P.

[57] ABSTRACT

Training carousel, in particular for horses, with a central drive device and with at least one arm driven to rotate by it, on whose outer end a grid device is disposed in the vicinity of an animal track, characterized by means of an electric insulation between the grid device or each grid device and the associated arm, and a device for applying a voltage to the grid device or each grid device.

21 Claims, 4 Drawing Sheets

TRAINING CAROUSEL

The present invention relates to a training carousel in particular for horses, with a central drive device and with at least one arm that is driven to rotate by it, on whose outer end, in the vicinity of an animal track, a grid device is disposed.

A training carousel of this kind is known from European Patent EP 0,424,788 B1. The known training carousel furthermore has a helical spring for each grid device, which connects the grid device to the associated arm. The helical springs are used so that the grid device pivots out of the way, for example when a horse stops and the grid device then reaches the crupper, i.e. the rear part of the horse, so that an injury to the animal is prevented. Furthermore, helical springs are used to drive the horse when it is moving too slowly and consequently, the grid device slowly bumps against the crupper of the animal, by means of which the helical springs are moved slightly back, and when the animal then moves a little faster, cause the grid device to pivot back into place so that the horse receives a light tap on its crupper and therefore moves a little faster overall.

Such an embodiment of a training carousel, however, has the disadvantage that it is relatively heavy.

The object of the invention, therefore, is to produce a training carousel of lower weight than the training carousel known from the prior art.

According to the invention, this object is attained by means of an electrical insulation between the grid device or each grid device and the associated arm, and by means of a device for applying a voltage to the grid device or to each grid device.

In this connection, it can be provided that the drive device include a center shaft from which at least one arm extends.

Furthermore, it can be provided that the drive device include a motor that drives the center shaft.

Preferably the motor is a low-voltage electric motor.

In particular, it can be provided that the motor be a 24 V electric motor.

According to another particular embodiment of the invention, it can be provided that the drive device include a power transmission device for transmitting the driving power of the motor to the center shaft.

Advantageously, the power transmission device includes a drive chain and a gear that is connected to the center shaft and is driven by way of the drive chain connected to the motor.

In a favorable manner, the power transmission device is embodied in such a way that it provides a slippage when the rotational motion of the training carousel is hindered or even prevented by means of external influences.

Furthermore, the provision can be made that the arm(s) is/are detachably fastened to the center shaft.

Furthermore, the provision can be made that the arm(s) include at least two tubular sections.

Advantageously, the at least two tubular sections can be inserted into each other.

Furthermore, the provision can also be made that the at least two tubular sections can be slid into each other.

According to another particular embodiment of the invention, the end of the arm or of each arm remote from the center shaft is secured by a respective carrying cable, which extends from the center shaft to the end of the respective arm remote from it.

Advantageously, the arm or each arm is comprised of aluminum.

In a favorable manner, the center shaft is comprised of stainless steel.

Furthermore, the provision can be made that the animal track be bounded by a circularly arranged inner fence and a circularly arranged outer fence.

According to another particular embodiment of the invention, the provision can be made that the grid device or each grid device include a grating.

Advantageously, the grating is made of a drawn profile. For example, it can be drawn from a steel sheet.

In particular, the provision can be made that the grating be made of steel.

The grating is advantageously fastened to the associated arm by means of at least two rubber suspension devices. The rubber suspension devices supply an electrically insulating connection between the grating and the associated arm.

According to another particular embodiment of the invention, the provision can be made that the device for applying a voltage include an internal voltage source. This can, for example, be a battery.

On the other hand, the provision can also be made that the device for applying a voltage includes a connecting device for connection to an external voltage source. For example, the external voltage source can be a line voltage source.

Advantageously, the internal or external voltage source includes a control device for generating voltage pulses. This provides current pulses to the grid device and therefore to an animal that is touching the grid device (electric fence effect).

According to another particular embodiment of the invention, the device for applying a voltage includes at least one power cable which runs through the associated arm in order to produce an electrical connection between the internal or external voltage source and the grid device(s). In this manner, a voltage is applied to the grid device without a power cable being visible and being exposed to the elements and also assures that in fact, only the respective grid device is electrified.

A sliding contact is advantageously provided between the internal or external voltage source and the power cable(s).

The external or internal voltage source advantageously supplies a low voltage to the grid device or to each grid device. It is therefore assured that an animal touching the grid device receives a harmless but unpleasant shock.

Furthermore, the provision can be made that the drive device is accommodated in a housing block, wherein only a part of the center shaft protrudes from the housing block.

In a favorable manner, the training carousel includes a control device for controlling the drive direction and speed.

Finally, the provision can be made that the control device is a remote control device. As a result, the training carousel can be controlled from a position disposed outside the training carousel. This is particularly advantageous in emergencies in which the training carousel must be switched off as rapidly as possible.

The invention is based on the surprising discovery that the electrified grid devices represent effective, light-weight drive devices for driving animals, and as a result, the entire training carousel has a weight that is quite low. Due to the low weight per unit power of the training carousel, a 24 volt electric motor (d.c. motor) is sufficient to drive the training carousel. This in turn leads to a low power consumption and low production of noise. As a result of the low weight of the training carousel, it can be easily trans-ported from one place to another so that it can be taken along, for example, to equestrian shows. Because of the low weight, neither a building permit nor a foundation is required. The simple design of the training carousel permits a rapid setup without outside assistance. This is the case in particular when the arms can be set up by sliding the tubular sections into each other without screw connection.

If the gratings are produced out of a drawn profile made of metal in such a way that they can twist, then the risk of injury to the animals is considerably reduced.

Other features and advantages of the invention ensue from the description below, in which an exemplary embodiment is explained in detail in conjunction with the schematic drawings.

Figure 1:
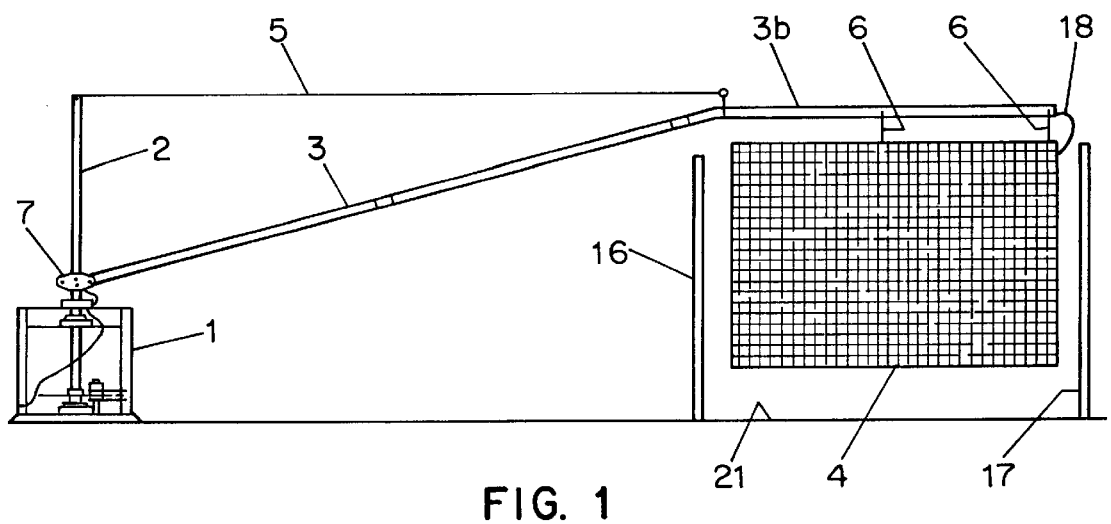
FIG. 1 is a schematic, partially sectional side view of a particular embodiment of the training carousel according to the current invention.

FIG. 1 is a schematic, partially sectional side view of a particular embodiment of the training carousel according to the present invention. The training carousel includes a housing block 1 in which a 24-volt electric motor is disposed (not shown), which drives a center shaft 2 that protrudes upward out of the housing block 1. The housing block 1 has the dimensions 850 mm×950 mm×850 mm (H×W×D) and must be opened from the side for maintenance or repair work. A total of four arms 3 are fastened to a fastening wing 7 by way of a screw connection. The arms 3 point upward from the center shaft 2 and are secured at the top ends by way of a carrying cable 5 which respectively extends outward from the center shaft 2. An arm extension 3b extends essentially horizontally outward. A grating 4 is connected to the arm extension 3b by way of two rubber suspension devices 6. A so-called animal track 21 is produced by means of a circularly arranged inner fence 16 and a circularly arranged outer fence 17. The overall structural height of the training carousel is 1.6 meters. The diameter of the training carousel is usually in the range from 13 to 18 m.

Figure 2:
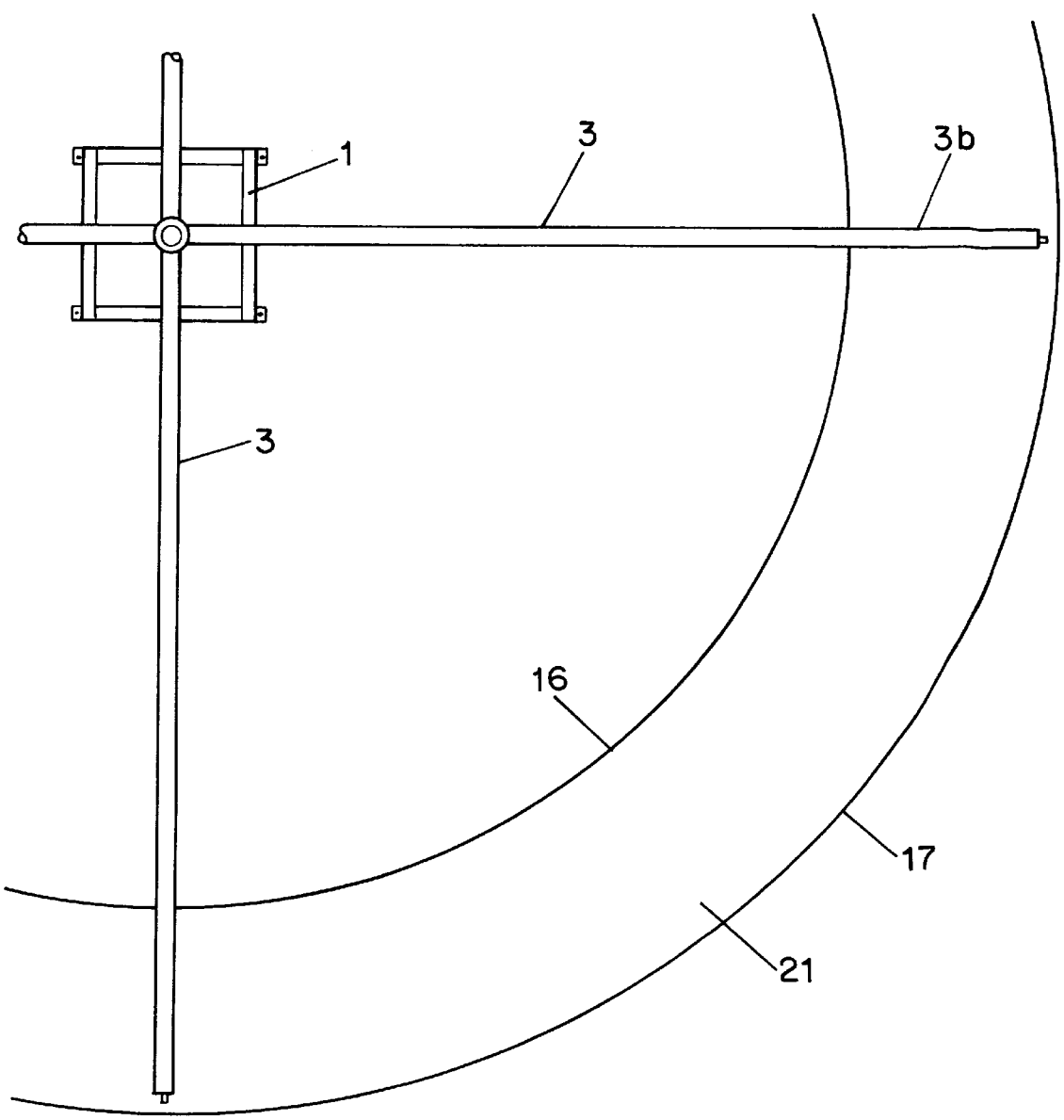
FIG. 2 is a top view of a part of the training carousel shown in FIG. 1.

FIG. 2 shows a top view of an area of the training carousel of FIG. 1.

Figure 3:
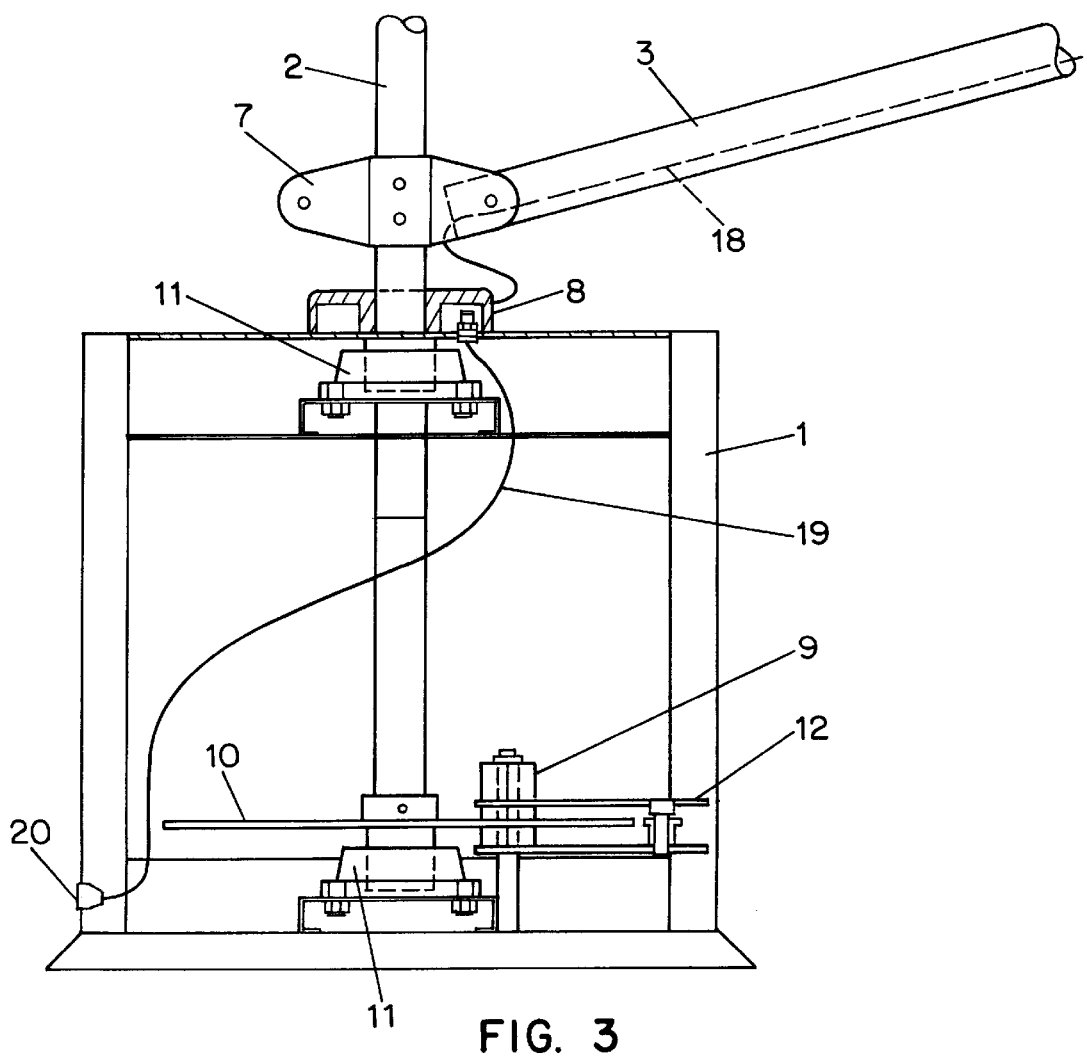
FIG. 3 shows details of the central region of the training carousel from FIG. 1.

FIG. 3 shows details of the central area of the training carousel of FIG. 1. The center shaft 2 is driven by a 24-V electric motor (d.c. motor) 9, which can be pivoted in the horizontal plane due to a motor suspension device 12, and is driven via a dive chain 13 (see FIG. 5) by way of a gear 10 disposed on the center shaft 2. If need be, a linkage can also be interposed. The center shaft 2 is supported in the lower region in a bearing 11. A power cable 8 extends through each arm 3 to the respective grating 4. The power cable 18 is connected to a connection bushing 20 by way of a sliding contact 14 (see FIG. 4) and an additional cable 19. The connection bushing 20 can be connected to a pulsed, external voltage source (not shown). For safety reasons, the voltage source, e.g. a storage battery or a battery, is disposed outside the entire training carousel.

Figure 4:
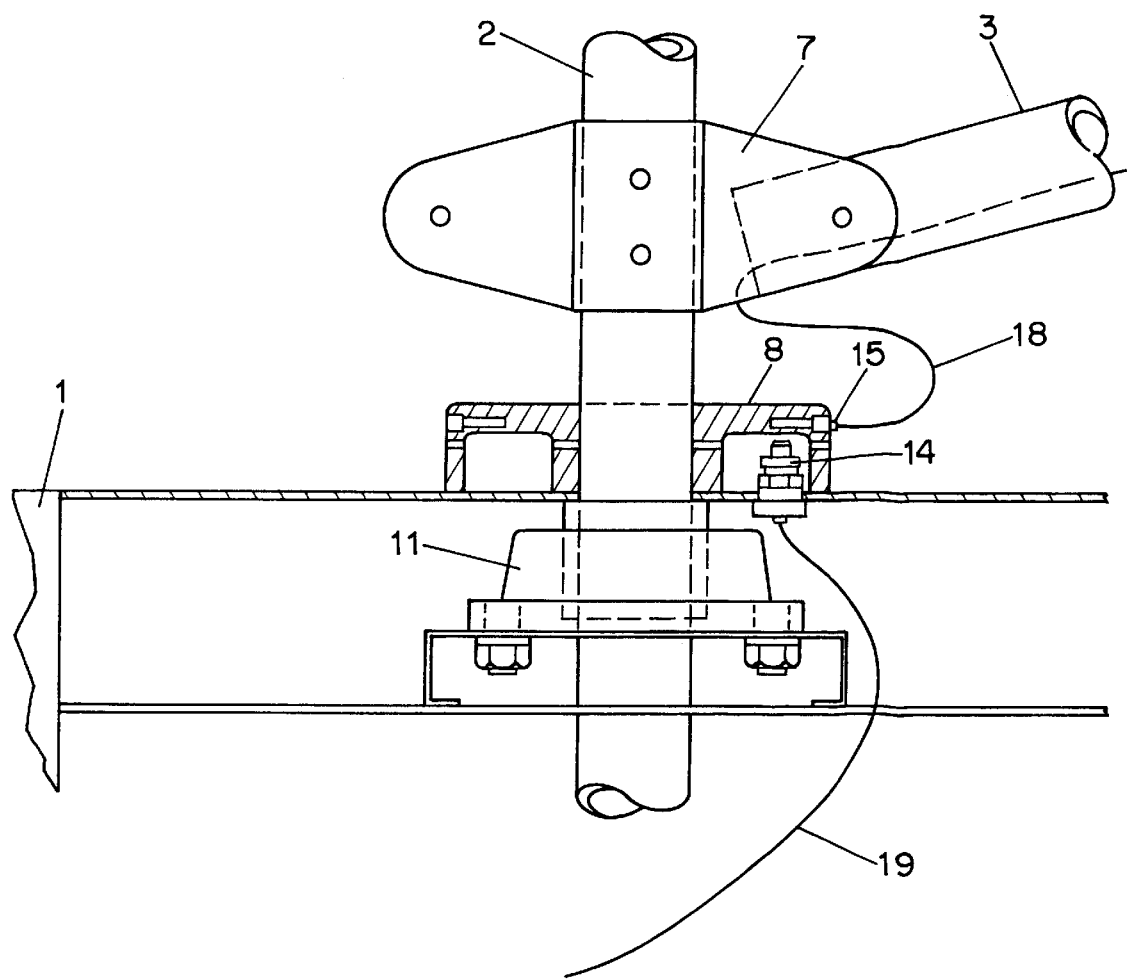
FIG. 4 shows details of the top region from FIG. 3.

FIG. 4 shows details of the upper area of FIG. 3. On its lower end, the power cable 18 has a banana plug, which is disposed in a connection bushing 15 in a current pulse pick-up disk 8. The banana plug therefore contacts the sliding contact 14, which is connected to the cable 19. This type of connection of the power cable 18 with the cable 19 provides a permanent electrical connection during the rotation of the arm 3 of the training carousel.

Figure 5:
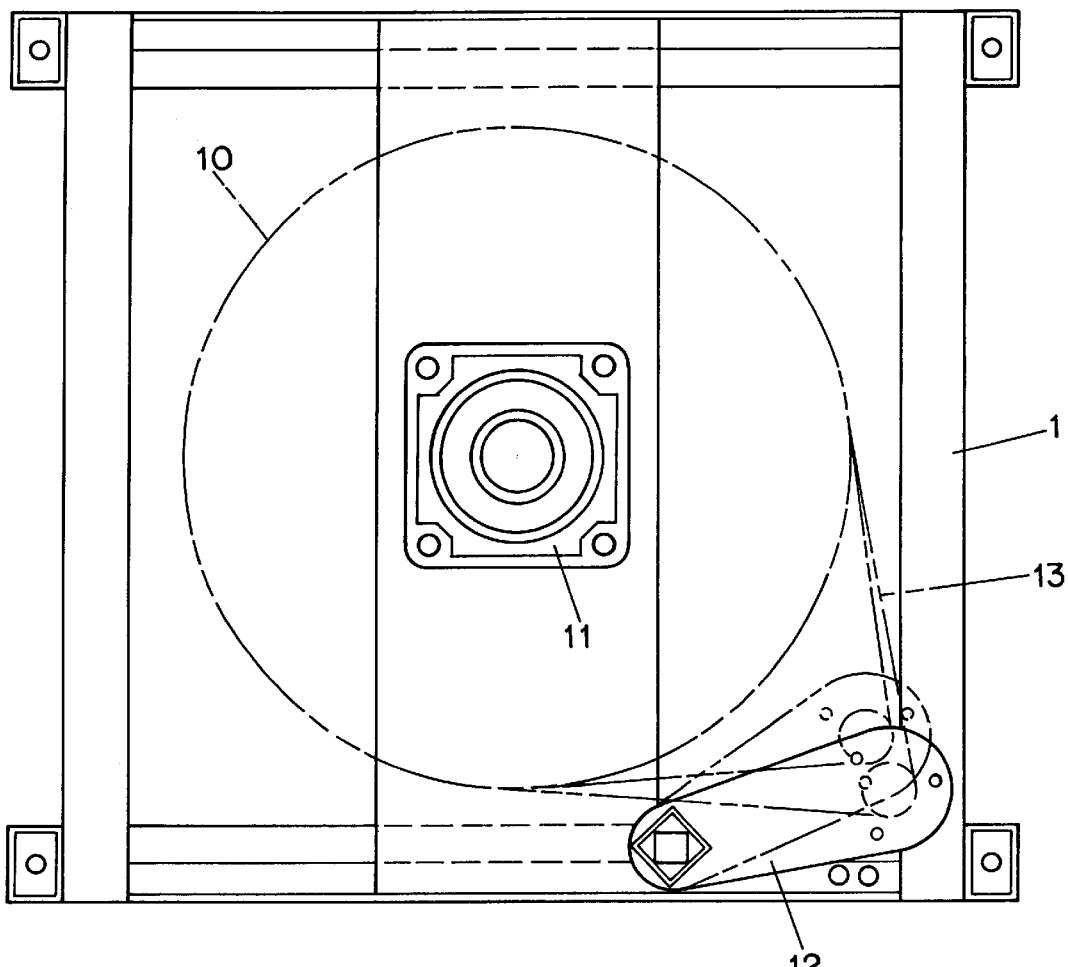
FIG. 5 shows a horizontal section through the housing block shown in FIG. 3.

FIG. 5 shows a horizontal section through the housing block 1 shown in FIG. 3. By means of the motor suspension 12, the motor in the form depicted can pivot in the horizontal plane, by means of which a slippage results when a obstacle hinders or even prevents a rotation of the training carousel. This prevents the risk of injury when a person or an animal ends up under the training carousel, for example as a result of falling in the animal track. The slippage could, for example, also be produced by means of an electric regulation.

Figure 6:
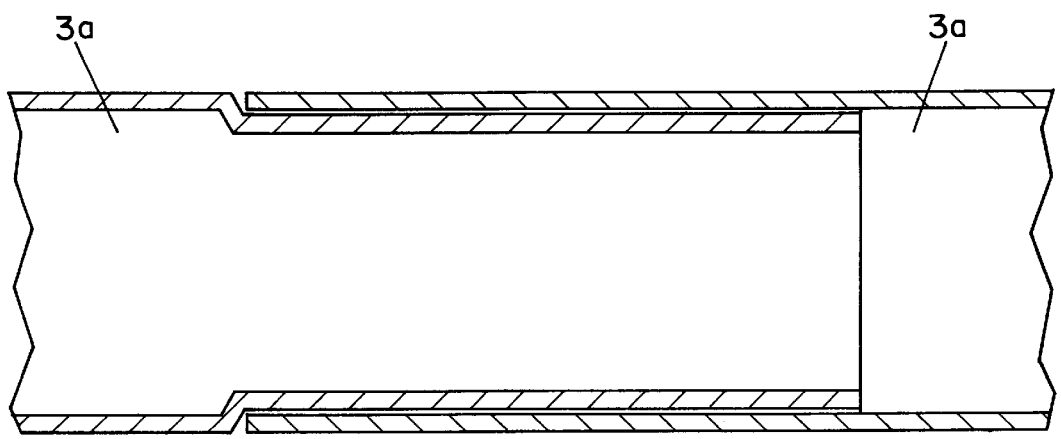
FIG. 6 shows a connection of two tubular sections of an arm of the training carousel according to FIG. 1.

FIG. 6 shows the connection between two tubular sections 3a of an arm that are slid into each other. Since the tubular sections 3a do not have to be screw connected, the training carousel can be assembled in a relatively simple manner.

Since the arms 3 are made of aluminum, the gratings 4 are made of steel, and the center shaft 2 is made of stainless steel, the overall weight (without the fences) is only 200 kg. This leads to a power consumption of 0.2 kWh with the use of a 24-V d.c. motor.

The features of the invention disclosed in the preceding description as well as in the claims and the accompanying drawings, can be essential for the realization of the invention in its various embodiments both individually and in arbitrary combinations.

I claim:

1. A training carousel, in particular for horses, comprising a central rotary drive device,
   an arm driven in rotation by the drive device and having an outer end portion adapted to be disposed generally above an animal track,
   a metal grid device supported in dependent relation on the outer end portion of the arm, the grid device being electrically insulated from the arm, and
   a device for applying a voltage to the grid device.

2. The training carousel according to claim 1, wherein the drive device includes a center shaft from which at the arm extends.

3. The training carousel according to claim 2, wherein the drive device includes a power transmission device for transmitting the driving power of the motor to the center shaft.

4. The training carousel according to claim 3, wherein the power transmission device includes a drive chain connected to the motor and a gear that is connected to the center shaft and is driven by the drive chain.

5. The training carousel according to claim 3, wherein the power transmission device is adapted to permit slippage between the motor and the center shaft when the rotating motion of the center shaft is hindered by external influences.

6. The training carousel according to claim 2, wherein the arm is detachably fastened to the center shaft.

7. The training carousel according to claim 2, wherein the arm includes two tubular sections releasably joined to each other.

8. The training carousel according to claim 7, wherein one of the two tubular sections is telescopically received in the other of the two tubular sections.

9. The training carousel according to claim 7, wherein one of the two tubular sections is telescopically received in the other of the two tubular sections in sliding relation.

10. The training carousel according to claim 2, wherein the center shaft is stainless steel.

11. The training carousel according to claim 2, wherein the drive device is accommodated in a housing block, and only a part of the center shaft protrudes from the housing block.

12. The training carousel according to claim 1, wherein the drive device includes a motor that drives the center shaft.

13. The training carousel according to claim 12, wherein the motor is a low voltage electric motor.

14. The training carousel according to claim 13, wherein the motor is a 24-volt d.c. electric motor.

15. The training carousel according to claim 12, and further comprising a control device for controlling the direction of rotation and the speed of the motor.

16. The training carousel according to claim 15, wherein the control device is remote from the rotary drive device.

17. The training carousel according to claim 1, wherein the arm is aluminum.

18. The training carousel according to claim 1, wherein the grid device includes a grating.

19. The training carousel according to claim 18, wherein the grating is made of a drawn profile.

20. The training carousel according to claim 18, wherein the grating is steel.

21. The training carousel according to claim 18, wherein the grating is fastened to the arm by at least two rubber suspension devices.

* * * * *